United States Patent
Palin et al.

(10) Patent No.: US 10,219,139 B2
(45) Date of Patent: Feb. 26, 2019

(54) METHOD AND APPARATUS FOR SWITCHING ACCESS POINTS BASED ON TOUCH SELECTION

(75) Inventors: Arto Palin, Viiala (FI); Jari Antero Nikara, Lempaala (FI); Vesa-Veikko Luukkala, Espoo (FI); Petri Liuha, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 983 days.

(21) Appl. No.: 13/452,254

(22) Filed: Apr. 20, 2012

(65) Prior Publication Data

US 2013/0281021 A1   Oct. 24, 2013

(51) Int. Cl.
*H04W 8/00* (2009.01)
*H04W 48/20* (2009.01)
*H04W 84/00* (2009.01)

(52) U.S. Cl.
CPC ............ *H04W 8/005* (2013.01); *H04W 48/20* (2013.01); *H04W 84/005* (2013.01)

(58) Field of Classification Search
CPC ............ H04B 5/00; H04B 5/02; H04W 4/008
USPC ...................................... 455/41.1, 41.2, 41.3
See application file for complete search history.

(56) References Cited

U.S. PATENT DOCUMENTS

| | | | |
|---|---|---|---|
| 4,873,530 A | 10/1989 | Takeuchi et al. | |
| 5,134,392 A | 7/1992 | Takeuchi et al. | |
| 8,315,617 B2 * | 11/2012 | Tadayon | H04M 3/53 455/418 |
| 2006/0273878 A1 * | 12/2006 | Michmerhuizen et al. | 340/5.72 |
| 2010/0207722 A1 | 8/2010 | Rutledge | |
| 2011/0257817 A1 * | 10/2011 | Tieman | B60R 25/24 701/2 |
| 2011/0309922 A1 | 12/2011 | Ghabra et al. | |

(Continued)

FOREIGN PATENT DOCUMENTS

| | | |
|---|---|---|
| EP | 1695880 A1 | 8/2006 |
| JP | 2006-88756 | 4/2006 |
| WO | WO 2011/053357 A1 | 5/2011 |

OTHER PUBLICATIONS

Varadarajan, "Bluetooth-Based Keyless Entry System", web page, 3 pages, The Clemson University Vehicular Electronics Laboratory, http://www.cvel.clemson.edu/auto/AuE835_Projects_2011/Varadarajan_project.html.

*Primary Examiner* — Andrew Wendell
*Assistant Examiner* — Maryam Soltanzadeh
(74) *Attorney, Agent, or Firm* — Ditthavong & Steiner, P.C.

(57) ABSTRACT

An approach is provided for configuring one or more mobile devices to multiple access points and/or services associated with at least one structure. An access platform determines status information associated with at least one structure, wherein the at least one structure is associated with one or more access points located in one part of the at least one structure, one or more other access points located in another part of the at least one structure, or a combination thereof. The access platform then processes and/or facilitates a processing of the status information to cause, at least in part, an activation, a deactivation, or a combination thereof of the one or more access points, one or more services associated with the one or more access points, the one or more other access points, one or more other services associated with the one or more other access points, or a combination thereof.

18 Claims, 9 Drawing Sheets

(56) References Cited

U.S. PATENT DOCUMENTS

2013/0059542 A1* 3/2013 Shimizu ............... H04W 4/043
                                                    455/67.11

* cited by examiner

300

400

METHOD AND APPARATUS FOR SWITCHING ACCESS POINTS BASED ON TOUCH SELECTION

BACKGROUND

Service providers and device manufacturers (e.g., wireless, cellular, etc.) are continually challenged to deliver value and convenience to consumers by, for example, providing compelling network services. One area of interest has been the development of interactive resources and services available to users of mobile devices (e.g., mobile phones or tablets) while driving or being a passenger in a vehicle. More specifically, the resources and services are provisioned between the mobile devices and one or more network attachment points (e.g., an access point (AP)) based on one or more short-range wireless communication technologies such as Bluetooth, Near Field Communication (NFC), or a combination thereof. Once a connection between a device and an access point has been established, the device can use the resources of the vehicle (e.g., loudspeakers, steering wheel buttons, hands-free or text-to-speech systems, etc.) and the vehicle can likewise benefit from the resources of the device (e.g., global positioning system (GPS) sensors, internet connectivity, messaging technologies, etc.). However, the introduction and/or use of multiple mobile devices near or within the vehicle pose a number of dynamic configuration and security concerns. In addition, manually matching one or more devices to one or more access points and/or services may be time consuming and cumbersome. Accordingly, service providers and device manufacturers face significant technical challenges in providing a service that expeditiously configures multiple devices to multiple access points and/or services associated with at least one structure.

SOME EXAMPLE EMBODIMENTS

Therefore, there is a need for an approach for configuring one or more mobile devices to multiple access points and/or services associated with at least one structure.

According to one embodiment, a method comprises determining status information associated with at least one structure, wherein the at least one structure is associated with one or more access points located in one part of the at least one structure, one or more other access points located in another part of the at least one structure, or a combination thereof. The method also comprises processing and/or facilitating a processing of the status information to cause, at least in part, an activation, a deactivation, or a combination thereof of the one or more access points, one or more services associated with the one or more access points, the one or more other access points, one or more other services associated with the one or more other access points, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine status information associated with at least one structure, wherein the at least one structure is associated with one or more access points located in one part of the at least one structure, one or more other access points located in another part of the at least one structure, or a combination thereof. The apparatus is also caused to process and/or facilitate a processing of the status information to cause, at least in part, an activation, a deactivation, or a combination thereof of the one or more access points, one or more services associated with the one or more access points, the one or more other access points, one or more other services associated with the one or more other access points, or a combination thereof.

According to another embodiment, a computer-readable storage medium carries one or more sequences of one or more instructions which, when executed by one or more processors, cause, at least in part, an apparatus to determine status information associated with at least one structure, wherein the at least one structure is associated with one or more access points located in one part of the at least one structure, one or more other access points located in another part of the at least one structure, or a combination thereof. The apparatus is also caused to process and/or facilitate a processing of the status information to cause, at least in part, an activation, a deactivation, or a combination thereof of the one or more access points, one or more services associated with the one or more access points, the one or more other access points, one or more other services associated with the one or more other access points, or a combination thereof.

According to another embodiment, an apparatus comprises means for determining status information associated with at least one structure, wherein the at least one structure is associated with one or more access points located in one part of the at least one structure, one or more other access points located in another part of the at least one structure, or a combination thereof. The apparatus also comprises means for processing and/or facilitating a processing of the status information to cause, at least in part, an activation, a deactivation, or a combination thereof of the one or more access points, one or more services associated with the one or more access points, the one or more other access points, one or more other services associated with the one or more other access points, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for configuring one or more mobile devices to multiple access points and/or services associated with at least one structure are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "touch" (e.g., touch interaction) refers to a method of expediting wireless configuration (e.g., device discovery and selection) based, at least in part, on proximity (e.g., Received Signal Strength Indication (RSSI) values). More specifically, touching, at least for the purposes of the current disclosure, does not require that the system components (e.g., a mobile device and an access point) actually come into physical contact with each other. Holding the system components (e.g., a mobile device and an access) in close proximity to one another (i.e., the RSSI reading of the device reaches a threshold criteria relative to the discovering device) for a short duration of time may be enough to trigger operations, after which the mobile device may be separated and utilized within the communication ranger of whatever wireless interaction may be implemented utilizing various types of short-range wireless communication technologies (e.g., Bluetooth/Bluetooth LE, NFC, wireless fidelity (WiFi), or a combination thereof). While a multitude of wireless communication mediums are available, the various embodiments of the present invention disclosed herein use Bluetooth for the sake of explanation. In addition, touch interactions may work in one of two ways. First, "touch-to-select" refers to the example use case where the device with which the user performs the choice activity (i.e., by touching) has the physical means to perform the selection operation (i.e., send the inquiry and calculate the RSSI value from the response). Second, "touch-to-be-selected" refers to the example use case where the device with which the user performs the choice activity (i.e., by touching) does not have the physical means to perform the selection operation, but the physical operation is detected by the device being touched.

Figure 1:
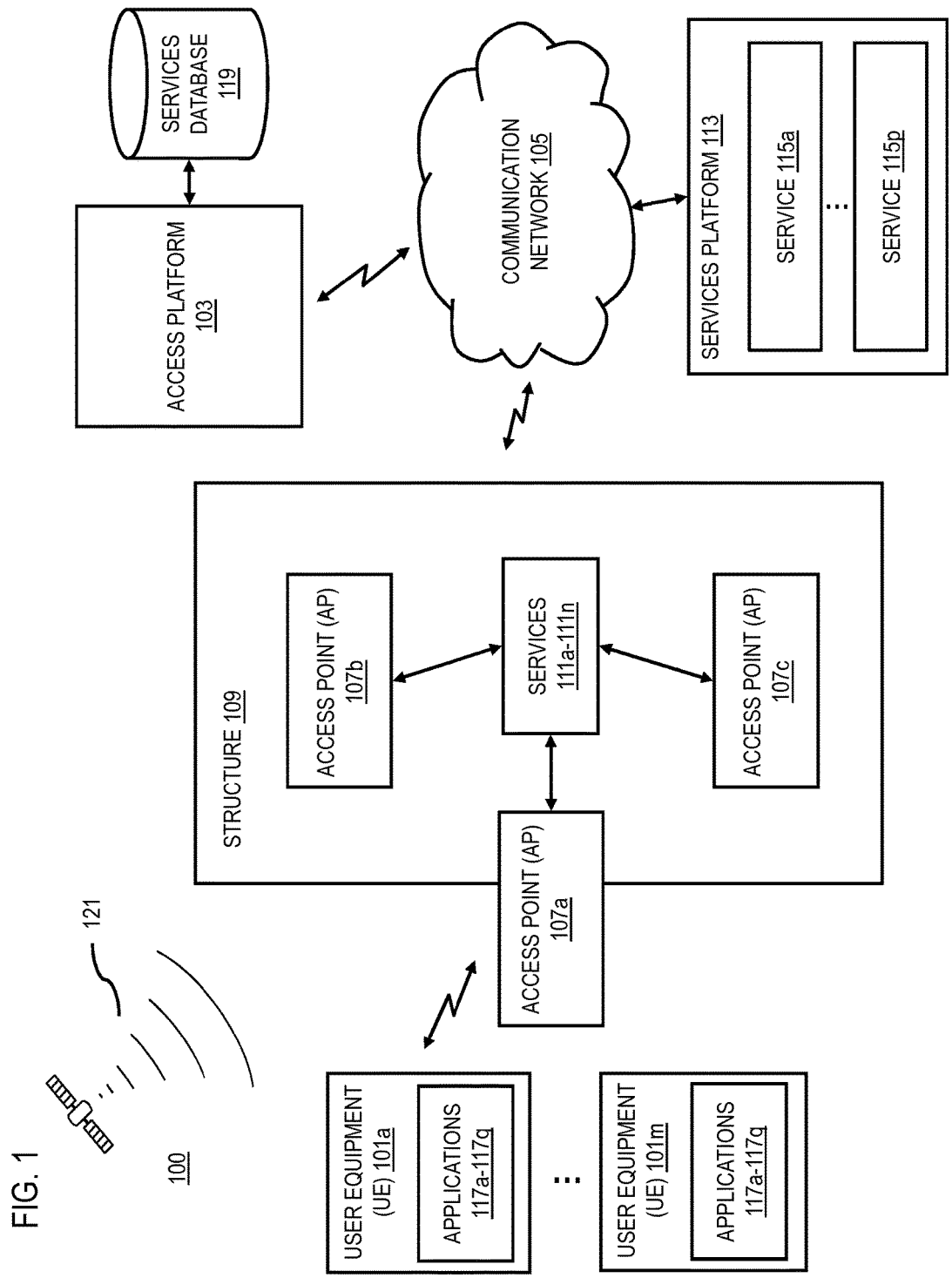
FIG. 1 is a diagram of a system capable of configuring one or more mobile devices to multiple access points and/or services associated with at least one structure, according to one embodiment.

FIG. 1 is a diagram of a system capable of configuring one or more mobile devices to multiple access points and/or services associated with at least one structure, according to one embodiment. As previously discussed, one area of interest among service providers and device manufacturers has been the development of interactive resources and services available to users of mobile devices (e.g., mobile phones or tablets) while driving or being a passenger in a vehicle. More specifically, the resources and services are provisioned between the mobile devices and the access points based on short-range wireless communication technologies such as Bluetooth, NFC, or a combination thereof. Once a connection between a device and an access point has been established, the device can use the resources of the vehicle (e.g., loudspeakers, steering wheel buttons, hands-free or text-to-speech systems, displays, projectors, etc.) and the vehicle may likewise benefit from the resources of the device (e.g., GPS sensors, internet connectivity, messaging technologies, display, projector, etc.). This enables use cases which essentially require multiple devices, where some of them may be generic and some of them particular (e.g. belonging to a specific person or having particular access rights or resources). Also this enables an orchestration of non-touch enabled devices. For example, the driver may listen to music stored on his or her mobile device through the loudspeakers of the vehicle and/or control playback with the steering wheel buttons and at the same time use the mobile device as an auxiliary display showing driving related information (e.g., average speed). If there are multiple devices in car, they may act as loudspeakers providing enhanced audio capabilities. However, the introduction and/or use of multiple mobile devices near or within the vehicle pose a number of dynamic configuration and security concerns (e.g., ownership, access, bandwidth allocation, location in the vehicle, etc.). In particular, manually matching one or more devices to one or more access points and/or services may be time consuming and cumbersome. In addition, access to the communication stack (e.g., Bluetooth stack) and associated services (e.g., services enabled by Bluetooth) of the structure (e.g., a vehicle) must be restricted to prevent undesired or hostile attempts to communicate with the one or more access points (e.g., swamping the system) or attempting to control the services (e.g., a random passerby accessing an access point and/or service within the vehicle or children accessing the steering wheel buttons from the backseat of the vehicle).

To address this problem, a system 100 of FIG. 1 introduces the capability to configure one or more mobile devices to multiple access points and/or services associated with at least one structure. In one embodiment, the system 100 first determines status information associated with the structure (e.g., a vehicle or a building), wherein the structure is associated with multiple access points or antennas that are located in one or more parts of the structure. More specifically, the status information is based on a locked state, an operational state, or a combination thereof of the structure, the one or more access points, or a combination thereof. Further, the one or more access points provide for short-range wireless communication (e.g., Bluetooth, NFC, or a combination thereof). In an exemplary embodiment, the access points have touch to select functionality (i.e., they can detect the proximity of another Bluetooth device and obtain service descriptions of the Bluetooth services that the touching device is offering) and may have different characteristics and operations based on the status of the structure. In another example use case, the Bluetooth device may also have touch to select functionality and can detect the proximity of the one or more access points. Also, at least one service associated with the one or more access points is associated with controlling entry to the at least structure.

By way of example, in one example use case, the structure is a vehicle that has at least two Bluetooth access points, wherein minimally one or more access points are located in part of the vehicle (e.g., the exterior) and one or more access points are located in another part of the vehicle (e.g., the interior). As a result, different services can be made available at different parts of the vehicle. For example, the one or more access points located in one part of the vehicle (e.g., the exterior) can be associated with controlling entry to the vehicle and the one or more access points located in another part of the vehicle (e.g., the interior) can be associated with one or more interior-related services (e.g., loudspeakers, steering wheel buttons, hands-free or text-to-speech systems, displays, projectors, etc.). In another example use case, the structure is a building (e.g., a home) and the one or more access points located in one part of the structure (e.g., the exterior) can similarly be associated with controlling entry (e.g., keyless entry) and the one or more access points located in another part of the structure (e.g., the interior) can be associated with one or more interior-related services (e.g., environmental and/or media controls).

In one embodiment, the system 100 next determines one or more rules for causing an activation, a deactivation, or a combination thereof (e.g., a sleep mode) of the one or more access points, the one or more services or a combination thereof. More specifically, the one or more rules include, at least in part, one or more dependencies among the one or more access points, the one or more services, or a combination thereof (e.g., a sequence of activations and/or deactivations). For example, when a structure (e.g., a vehicle) is locked, the one or more access points located in one part of the vehicle (e.g., the exterior) may be set to do inquiry with limited transmission (Tx) power to prevent "radio frequency (RF) pollution" or the access point can be programmed to inquiry at certain intervals (e.g., typically at 2.56 s intervals). At the same time, the one or more access points located in another part of the vehicle (e.g., the interior) are deactivated by the system 100. Therefore, in the locked state, unlocking the vehicle is the only available service. However, once the vehicle is unlocked (e.g., by touching), the system 100 switches the inquiry status of the one or more access points so that the one or more access points located in one part of the vehicle (e.g., the exterior) are deactivated and the one or more access points located in another part of the vehicle (e.g., the interior) begin to do inquiry. The system 100 then processes the status information based, at least in part, on the rules to cause the activation, the deactivation, of a combination thereof of the access points, the services, or a combination thereof.

In one embodiment, once the system 100 determines the status information and rules, the system 100 determines proximity information associated with one or more devices (e.g., a mobile phone or tablet) relative to the one or more access points of the least one structure based on one or more inquiry messages, one or more connectivity requests, or a combination thereof exchanged among the one or more devices, the one or more access points, or a combination thereof. By way of example, in an example use case using Bluetooth, the discovering device (e.g., an exterior access point) is in inquiry mode and sends one or more identity (ID) packets and the discoverable device (e.g., a mobile device) scans periodically for ID packets and responds with frequency hopping synchronization (FHS) packets. In addition, the discoverable device may send an Extended Inquiry Response (EIR) after the FHS to deliver more information about the device. It is contemplated that if the one or more devices and the one or more access points are able to exchange one or more ID, EIR, and FHS packets, respectively, then the one or more devices and the one or more access points are relatively close to one another (e.g., within a range of approximately 100 m).

More specifically, in one embodiment, the system 100 determines the proximity information based on one or more touch interactions, one or more proximity detection mechanisms, or a combination thereof. In particular, when the discovering device receives the inquiry response, it defines the RSSI from the FHS. The signal strength of the device is heavily attenuated when the signal leaves the antenna. The signal strength difference of devices a few centimeters apart compared to devices 50 centimeters apart can be several tens of decibels (dBs). This property of signal attenuation makes it possible to filter out devices based on their RSSI readings. Further, the RSSI reading of a discoverable device (e.g., a mobile device) can be followed by one or more access points that are doing inquiry and once the RSSI value of the mobile device reaches a threshold criteria (e.g., in touching range) the mobile phone can be selected. More specifically, in this example use case, the user associated with the mobile device is selecting part of the vehicle (e.g., an exterior access point) by touching it.

In one embodiment, the system 100 next processes the proximity information, authentication information, context information, or a combination thereof of the touching device to cause an authentication of the device to potentially grant entry to the structure (e.g., a vehicle or a building). By way of example, in one example use case, when a vehicle of the system 100 is locked, the one or more access points located in one part of the vehicle (e.g., the exterior) are activated and are doing inquiry (e.g., at 2.56 s intervals). When a device (e.g., a mobile phone) is found by the one or more access points of the system 100, the system 100 checks the RSSI level of the device to determine if it is in the predetermined range of action (i.e., whether the RSSI level is above a certain threshold). If the system 100 determines that the RSSI level is above the threshold, then the system 100 determines if the Bluetooth address of the device is in the authenticated devices list (e.g., the device of the vehicle's owner). If so, then the system 100 attempts to make a secure connection between the device and the one or more access points in one part of the structure (e.g., the exterior). This process ensures that this device is really authenticated because only authenticated devices have the correct link keys. If it is not authenticated (e.g., it is somehow faking the Bluetooth address), the link keys are not valid and the system 100 returns the one or more access points located in one part of the structure to an inquiry status. However, if the device is authenticated, then the system 100 unlocks the doors of the vehicle, deactivates the one or more access points located in one part of the vehicle (e.g., the exterior), and activates the one or more access points located in another part of the vehicle (e.g., the interior). In addition, the system 100 can initiate one or more internal services based on the particular user that has entered the vehicle and from which door he or she has entered (e.g., adjust mirrors, seats, etc. according to personal preferences). If on the other hand, the device is not authenticated (e.g., a device belonging to a passerby), the system 100 returns the one or more access points located in one part of the vehicle (e.g., the exterior) to an inquiry status.

In another example use case, a vehicle is stopped. The driver of the vehicle exits the vehicle with his or her mobile device. Based on the status of the vehicle and the predetermined rules, the system 100 activates the one or more access points located in one part of the vehicle (e.g., the exterior) and tracks the mobile device based on RSSI readings. In a further example use case, the one or more access points located in another part of the vehicle (e.g., the interior) may remain active for a predetermined period in order to also track the user and determine whether he or she has left the vehicle. In one embodiment, once the driver is some meters from the vehicle (e.g., at an RSSI below −60 dBm), the system 100 locks the doors and deactivates the one or more interior access points.

As shown in FIG. 1, the system 100 comprises one or more user equipment (UE) 101a-101m (e.g, a mobile phone or tablet) (also collectively referred to as UEs 101) having connectivity to an access platform 103 via a communication network 105. The UEs 101 also have connectivity to one or more access points (APs) 107a-107c (also collectively referred to as APs 107) associated with a structure 109 (e.g., a vehicle or a building) via one or more short-range communication technologies (e.g., Bluetooth, NFC, or a combination thereof). The access platform 103 may exist in whole or in part within the structure 109, or independently. The APs 107 also have local connectivity to services 111a-111n (e.g., entry, loudspeakers, steering wheel buttons, hands-free or text-to-speech systems, displays, projectors, etc.) found within the structure as well as connectivity to the access platform 103 and a services platform 113 via the communication network 105. The services platform 113 provides one or more services 115a-115p (also collectively referred to as services 115) to the components of the system 100 or the components of structure 109. The services 115 may include a wide variety of services such as content provisioning services for the one or more applications 117a-117q of the UEs 101 (e.g., mapping and navigation applications, media applications, games, etc.) (also collectively referred to as applications 117) and the services 111. The access platform 103 is further connected a services database 119. The services database 119 may include one or more service descriptions obtained from the UEs 101 that are touching and/or have recently touched the APs 107, the local services 111, the services 115, or a combination thereof as well as a list of one or more authenticated devices based, at least in part, on Bluetooth addresses associated with the UEs 101. The services database 119 may exist in whole or in part within the access platform 103, or independently.

In certain embodiments, the applications 117 of the UEs 101 may utilize location-based technologies (e.g., GPS, cellular triangulation, Assisted GPS (A-GPS), etc.) to make a request to one or more services 115 for location-based data (e.g., mapping and navigation information) based on a position relative to a UE 101. For example, the UE 101 may include a GPS receiver to obtain geographic coordinates from satellites 121 to determine its current location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the access platform 103 first determines status information associated with the structure 109 (e.g., a vehicle or a building), wherein the structure 109 is associated with multiple access points or antennas (e.g., APs 107). More specifically, the status information is based on a locked state, an operational state, or a combination thereof of the structure 109, the access points 107, or a combination thereof. Further, the APs 107 provide for short-range wireless communication (e.g., Bluetooth, NFC, or a combination thereof). Moreover, the APs 107 have touch-to-select functionality (i.e., they can detect the proximity of another Bluetooth device and obtain service descriptions of the Bluetooth services that the touching device is offering) and may have different characteristics and operations based on the status of the structure 109. In addition, at least one service 109 associated with the one or more APs 107 in one part of the structure (e.g., AP 107a) is associated with controlling entry to the structure 109.

In one example use case, the structure 109 is a vehicle that has at least two Bluetooth APs 107, wherein minimally one or more access points (e.g., AP 107a) are located in one part of the structure 109 (e.g., the exterior) and one or more access points (e.g., APs 107b and 107c) are located in another part of the structure 109 (e.g., the interior). As a result, different services (e.g., services 111, services 115, or a combination thereof) can be made available at different parts of the structure 109. For example, the AP 107a can be associated with controlling entry to the structure 109 and the APs 107b and 107c can be associated with one or more interior-related services (e.g., loudspeakers, steering wheel buttons, hands-free or text-to-speech systems, displays, projectors, etc.). In another example use case, the structure 109 is a building (e.g., a home) and the AP 107a can similarly be associated with controlling entry (e.g., keyless entry) and the APs 107b and 107c can be associated with one or more interior-related services 111 (e.g., environmental and/or media controls).

In one embodiment, the access platform 103 next determines one or more rules for causing an activation, a deactivation, or a combination thereof (e.g., a sleep mode) of the APs 107, the services 111, or a combination thereof. More specifically, the one or more rules include, at least in part, one or more dependencies among the APs 107, the services 111, or a combination thereof (e.g., a sequence of activations and/or deactivations). By way of example, when the structure 109 (e.g., a vehicle) is locked, the one or more access points located in one part of the structure (e.g., AP 107a) can be set to do inquiry with limited Tx power to prevent "RF pollution" or the AP 107a can be programmed to do inquiry at certain intervals (e.g., typically at 2.56 s intervals). At the same time, the one or more access points located in another part of the structure (e.g., APs 107b and 107c) are deactivated by the access platform 103. Therefore, in the locked state, unlocking the structure 109 is the only available service 109. However, once the structure 109 is unlocked (e.g., by touching), the access platform 103 can determine to switch the inquiry status of the APs 107 so that the one or more access points located in one part of the structure (e.g., AP 107a) are deactivated and the one or more access points located in another part of the structure (e.g., APs 107b and 107c) begin to do inquiry. The access platform 103 then processes the status information based, at least in part, on the rules to cause the activation, the deactivation, or a combination thereof of the APs 107, the services 111, or a combination thereof.

In one embodiment, once the access platform 103 determines the status information and rules, the access platform 103 determines proximity information associated with the UEs 101 (e.g., a mobile phone or tablet) relative to the APs 107 (e.g., AP 107a) of structure 109 based on one or more inquiry messages, one or more connectivity requests, or a combination thereof exchanged among the UEs 101, the APs 107, or a combination thereof. More specifically, the access platform 103 determines the proximity information based on one or more touch interactions, one or more proximity detection mechanisms, or a combination thereof. As previously discussed, in an example use case using Bluetooth, the discovering device (e.g., AP 107a) is in inquiry mode and sends one or more ID packets and the discoverable device (e.g., a UE 101) scans periodically for ID packets and responds with FHS packets. In addition, the UE 101 may send an EIR after the FHS to deliver more information about the device. When the AP 107a receives the inquiry response, it defines the RSSI of the UE 101 from the FHS. Once the RSSI meets a threshold criteria (e.g., in touching range) the AP 107a can be selected by the UE 101. More specifically, in this example use case, the user associated with the UE 101 is selecting part of the structure 109 (e.g., AP 107a) by touching it (i.e., Touch-to-be-Selected).

In one embodiment, the access platform 103 then processes the proximity information, authentication information, context information, or a combination thereof of the touching UE 101 to cause an authentication of the UE 101 to potentially grant entry to the structure 109 (e.g., a vehicle). By way of example, in one example use case, when the structure 109 is locked, the one or more access points located in one part of the structure (e.g., AP 107a) are activated and are doing inquiry (e.g., at 2.56 s intervals). When a UE 101 (e.g., a mobile phone) is found by the AP 107a, the access platform 103 checks the RSSI level of the UE 101 to determine if it is in the predetermined range of action (i.e., whether the RSSI level is above a certain threshold value). If the access platform 103 determines the RSSI level is above the threshold, then the access platform 103 determines if the Bluetooth address of the UE 101 is in the authenticated devices list (e.g., the UE 101 of the vehicle's owner). If so, then the access platform 103 attempts to make a secure connection between the UE 101 and the AP 107a. This process ensures that the UE 101 is really authenticated because only authenticated devices have the correct link keys. If it is not authenticated (e.g., it is somehow faking the Bluetooth address), then the access platform 103 returns the AP 107a to an inquiry state and possibly blocks one or more unauthenticated devices automatically, especially if unauthenticated trials are consecutive. However, if the UE 101 is authenticated, then the access platform 103 unlocks the doors of the structure 109, deactivates the AP 107a, and activates the one or more access points located in another part of the structure (e.g., APs 107b and 107c). In addition, the access platform 103 can initiate one or more of the services 111 based on the particular user associated with the UE 101 and from which door the user entered the structure 109 (e.g., adjust car mirrors, seats, etc. according to personal preferences). If on the other hand, the UE 101 is not authenticated (e.g., a device of a random passerby), the access platform 103 returns the one or more access points located in one part of the structure (e.g., AP 107a) to an inquiry status and maintains a locked vehicle status.

In another example use case, a structure 109 (e.g., a vehicle) is stopped. The driver of the vehicle exits the vehicle with his or her UE 101. Based on the status of the vehicle and the predetermined rules, the access platform 103 activates the one or more access points located in one part of the structure (e.g., AP 107*a*) and tracks the UE 101 based on its RSSI readings. In further example use case, the one or more interior access points may remain active for a predetermined period in order to also track the user and determine whether he or she has left the vehicle. In one embodiment, once the driver is some meters away from the vehicle (e.g., at an RSSI below −60 dBm), the access platform 103 locks the doors and deactivates the one or more access points located in another part of the structure (e.g., APs 107*b* and 107*c*).

By way of example, the UEs 101, the access platform 103, the APs 107, the services platform 113, the services 115, the applications 117, and the satellites 121 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
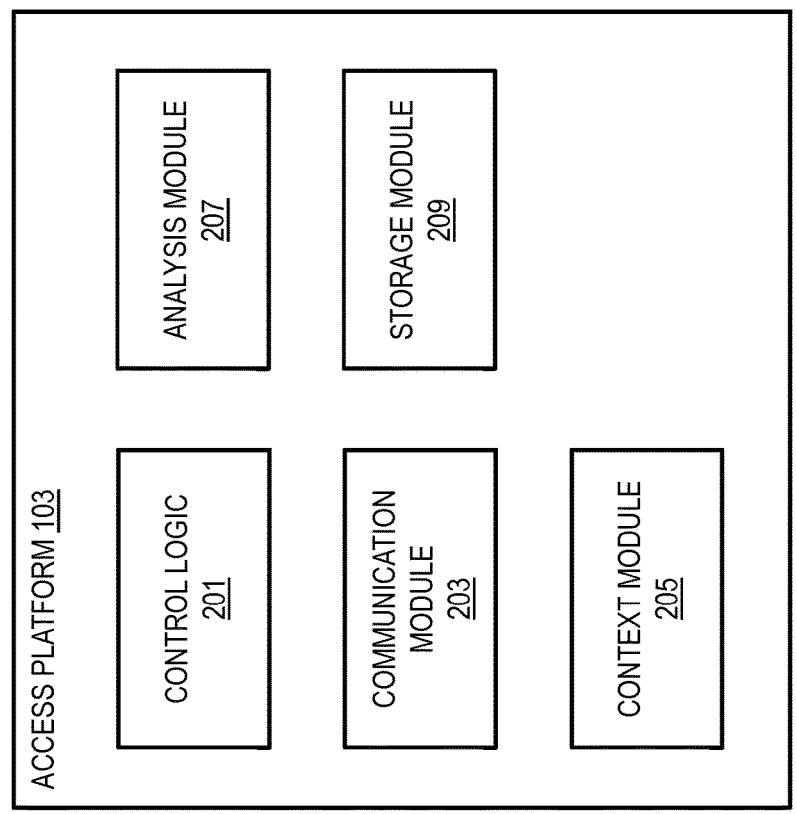
FIG. 2 is a diagram of the components of an access platform, according to one embodiment.

FIG. 2 is a diagram of the components of an access platform 103, according to one embodiment. By way of example, the access platform 103 includes one or more components for providing configuring one or more mobile devices to multiple access points and/or services associated with at least one structure. It is contemplated that the functions of these components may be combined in one or more components or performed by other components of equivalent functionality. In this embodiment, the access platform 103 includes a control logic 201, a communication module 203, a context module 205, an analysis module 207, and a storage module 209.

The control logic 201 oversees tasks, including tasks performed by the communication module 203, the context module 205, the analysis module 207, and the storage module 209. For example, although the other modules may perform the actual task, the control logic 201 may determine when and how those tasks are performed or otherwise direct the other modules to perform the task. The control logic 201 may also be used to determine one or more rules for causing the activation, the deactivation, or a combination thereof of the one or more access points, the one or more services (e.g., entry, loudspeakers, steering wheel buttons, etc.), or a combination thereof including, at least in part, one or more one or more dependencies associated with the one or more rules. For example, the control logic 201 may determine that when the one or more external access points are activated, the one or more internal access points are deactivated and vice-versa.

The communication module 203 is used for communication between the access points 107 and the services 111 of the structure 109, the access platform 103, the services 115 of the services platform 113, the applications 117 of the UEs 101, the services database 119, and the satellites 121. The communication module 203 may be used to communicate commands, requests, data, etc. The communication module 203 also may be used to facilitate one or more short-range wireless communications among the UEs 101 and the APs 107 including, at least in part, Bluetooth, NFC, or a combination thereof. For example, the communication module 203, in an example use case using Bluetooth, may be used in connection with the APs 107 to transmit one or more ID packets.

The context module 205 is used to determine the status or situation of the structure 109 (e.g., a vehicle or a building), the one or more access points (e.g., APs 107), or a combination thereof. More specifically, the context module 205 is used to determine status information based on a locked state, an operational state, or a combination thereof of the structure 109, the APs 107, or a combination thereof. The context module 205, in connection with the control logic 201 and the communication module 203, may also be used to process the status information (e.g., locked doors) to cause an activation, a deactivation, or a combination thereof of the APs 107, the services 111, or a combination thereof.

The analysis module 207 is used to determine proximity information of one or more devices (e.g., the UEs 101) to the one or more access points (e.g., APs 107), or a combination thereof based, at least in part, on one or more inquiry messages, one or more connectivity requests, or a combination thereof exchanged among the one or more devices, the one or more access points, or a combination thereof. More specifically, the analysis module 207 determines the proximity information based on one or more touch interactions, one or more proximity mechanisms, or a combination thereof. Further, the analysis module 207 may also be used, in connection with the control logic 201 and the communication module 203, to process the proximity information, authentication information, context information, or a combination thereof of one or more devices to cause an authentication of the one or more devices (e.g., UEs 101) to potentially grant entry to structure 109.

By way of example, in an example use case using Bluetooth wireless communication, the structure 109 (e.g., a vehicle) is locked and the one or more access points located in one part of the structure (e.g., AP 107*a*) are activated and doing inquiry (e.g., at 2.56 s intervals). When a device (e.g., a mobile phone) is found by the one or more access points located in one part of the structure, the analysis module 207 is used to check the RSSI level of the device to determine if it is in the predetermined range of action (i.e., whether the RSSI level is above a certain threshold). If the analysis module 207 determines that the RSSI level is above the threshold, then the analysis module 207 determines if the Bluetooth address of the device is in the authenticated devices list (e.g., the device of the vehicle's owner). If so, the analysis module 207 causes, at least in part, the control logic 201 and the communication module 203 to establish a secure connection between the device and the access point.

The storage module 209 is used to manage the storage one or more service descriptions obtained from the one or more devices (e.g., UEs 101) that are touching and/or have recently touched the one or more access points (e.g., APs 107), the local services 111, the services 115, or a combination thereof as well as the list of one or more authenticated devices based, at least in part, on the Bluetooth addresses associated with the one or more devices.

Figure 3:
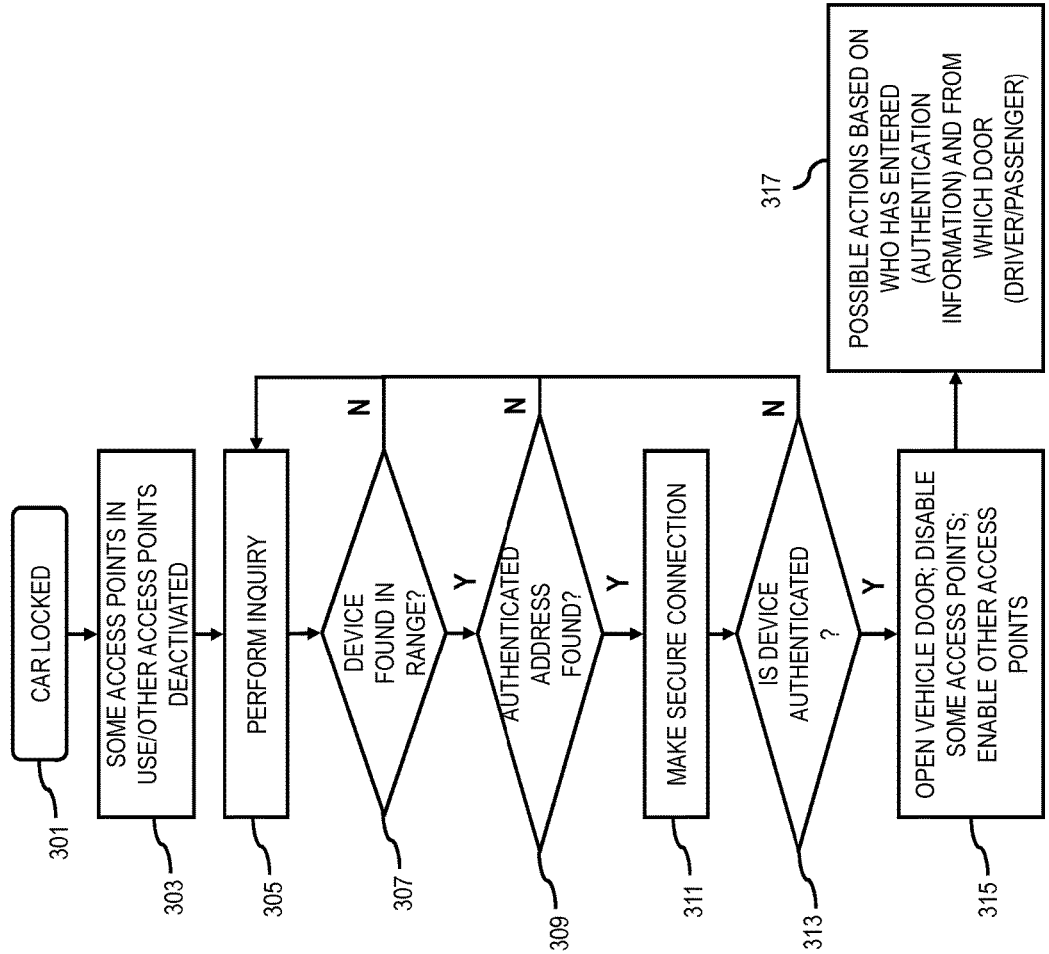
FIG. 3 is a diagram of a workflow for configuring one or more mobile devices to multiple access points and/or services associated with a locked structure, according to one embodiment.

FIG. 3 is a diagram of a workflow for configuring one or more mobile devices to multiple access points and/or services associated with a locked structure, according to one embodiment. By way of example, the workflow process 300 is applicable to Bluetooth communication wherein the one or more access points of the structure (e.g., a vehicle) are doing the inquiry and the one or more mobile devices (e.g., a mobile phone or tablet) are doing the inquiry scanning. In step 301, the system 100 determines the vehicle is in a locked status. In step 303, the system 100 determines to activate the one or more access points located in one part of the vehicle (e.g., the exterior) and deactivate the one or more other access points located in another part of the vehicle (e.g., the interior) based on the status of the vehicle and the predetermined rules and/or dependencies. In step 305, the system 100 causes, at least in part, the one or more access points located in one part of the vehicle to perform inquiry (e.g., at 2.56 s intervals). In step 307, the system 100 determines whether a device (e.g., a mobile device) is within range of the one or more access points. More specifically, the system 100 determines whether the RSSI level of the one or more devices is in the predetermined range of action (i.e., whether the RSSI level is above a certain threshold). If the system 100 determines the RSSI level of the device is below the threshold, then the system 100 returns the one or more access points located in one part of the vehicle (e.g., the exterior) to an inquiry status, corresponding to step 305. However, if the system 100 determines that the RSSI level of the device is above the threshold, then in step 309, the system 100 determines that if the Bluetooth address of the device is in the authenticated devices list (e.g., the device of the vehicle's owner). If the system 100 determines that the Bluetooth address is not in the authenticated devices list, then the system 100 again returns the one or more access points located in one part of the vehicle (e.g., the exterior) to an inquiry status, corresponding to step 305 and possibly blocks the one or more unauthenticated devices automatically, especially if unauthenticated trials are consecutive. However, if the system determines that the Bluetooth address is in the authenticated devices list, then in step 311, the system 100 attempts to make a secure connection between the device and the particular access point. In step 313, the system 100 determines whether the device is authenticated (i.e., has the correct link keys). If the device is not authenticated (e.g., it is somehow faking the Bluetooth address) then the system 100 returns the one or more access points located in one part of the vehicle (e.g., the exterior) to an inquiry status, corresponding to step 305. However, if the device is authenticated, in step 315, the system 100 unlocks the vehicle doors, deactivates the one or more access points located in one part of the vehicle (e.g., the exterior), and activates the one or more other access points located in another part of the vehicle (e.g., the interior). In addition, in step 317, the system 100 can initiate one or more interior services based on the particular user that has entered the vehicle and from which door he or she has entered (e.g., adjust mirrors, seats, etc. according to personal preferences).

Figure 4:
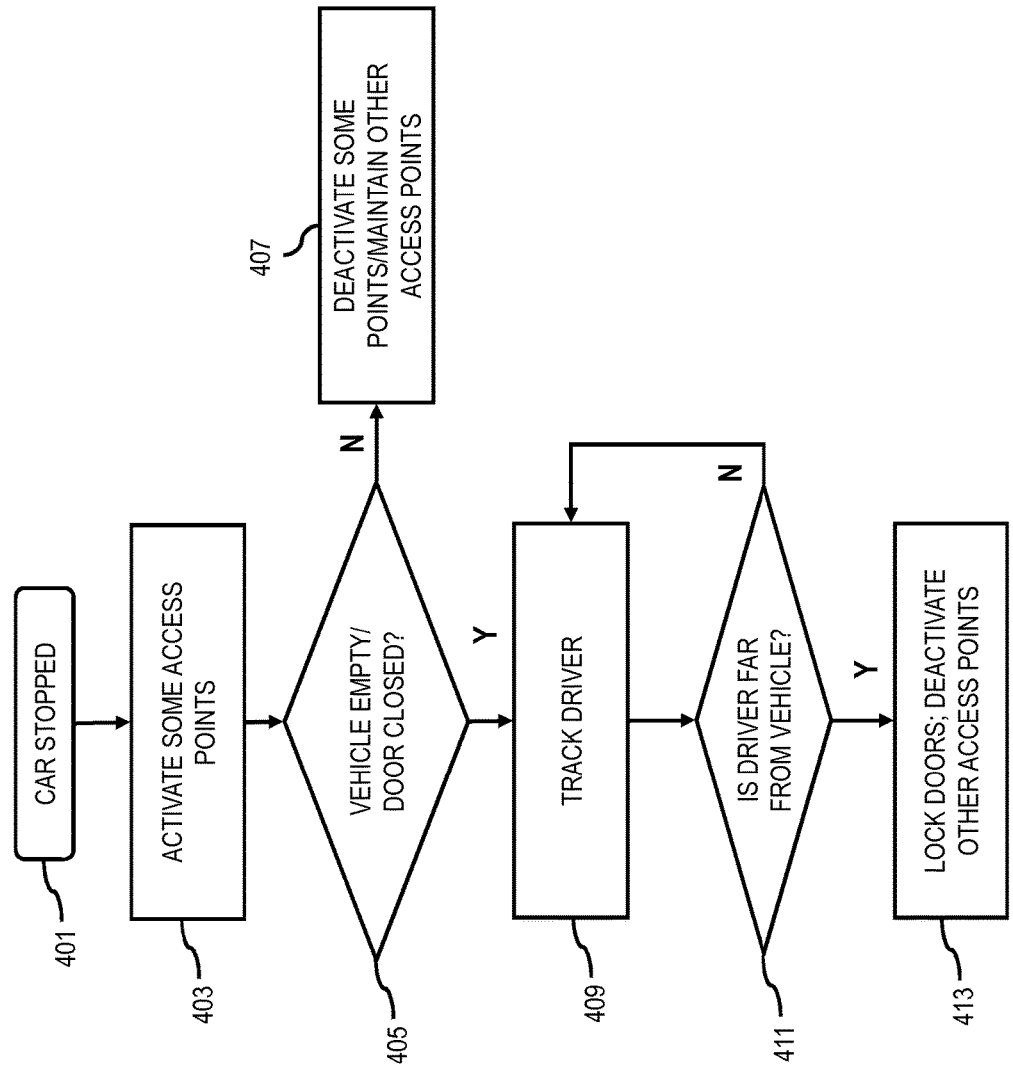
FIG. 4 is a diagram of a workflow for configuring one or more mobile devices to multiple access points and/or services associated with a stopped vehicle, according to one embodiment.

FIG. 4 is a diagram of a workflow for configuring one or more mobile devices to multiple access points and/or services associated with a stopped vehicle, according to one embodiment. By way of example, the workflow process 400 is applicable to Bluetooth communication wherein the one or more access points of the vehicle are doing the inquiry and the one or more mobile devices (e.g., a mobile phone or tablet) are doing the inquiry scanning. In step 401, the system 100 determines that the vehicle is stopped (e.g., parked). In step 403, the system 100 activates the one or more access points located in one part of the vehicle (e.g., the exterior) based on the status of the vehicle and the predetermined rules and/or dependencies. In step 405, the system 100 periodically determines (e.g., every couple of minutes) whether the one or more doors are closed and more importantly whether one or more devices are still in the vehicle (e.g. using one or more access points located in another part of the vehicle and RSSI measurements). In step 407, if the system 100 determines that the vehicle is not empty, then the system 100 deactivates the one or more access points located in one part of the vehicle (e.g., the exterior) activated in step 403, and maintains the activation of the one or more other access points located in another part of the vehicle (e.g., the interior). However, if the system 100 determines that the vehicle is empty, then in step 409, the system 100 causes, at least in part, one or more access points located in one part of the vehicle (e.g., the exterior) to track the mobile device associated with the driver based on RSSI readings. In step 411, the system 100 determines the distance of the driver from the vehicle. If the driver is relatively close to vehicle (e.g., an RSSI above −60 dBm), then the system 100 continues to track the driver, corresponding to step 409. However, if the driver is some meters away from the vehicle (e.g., an RSSI below −60 dBm), then in step 413, the system 100 locks the doors of the vehicle and deactivates the one or more other access points located in another part of the vehicle (e.g., the interior).

Figure 5:
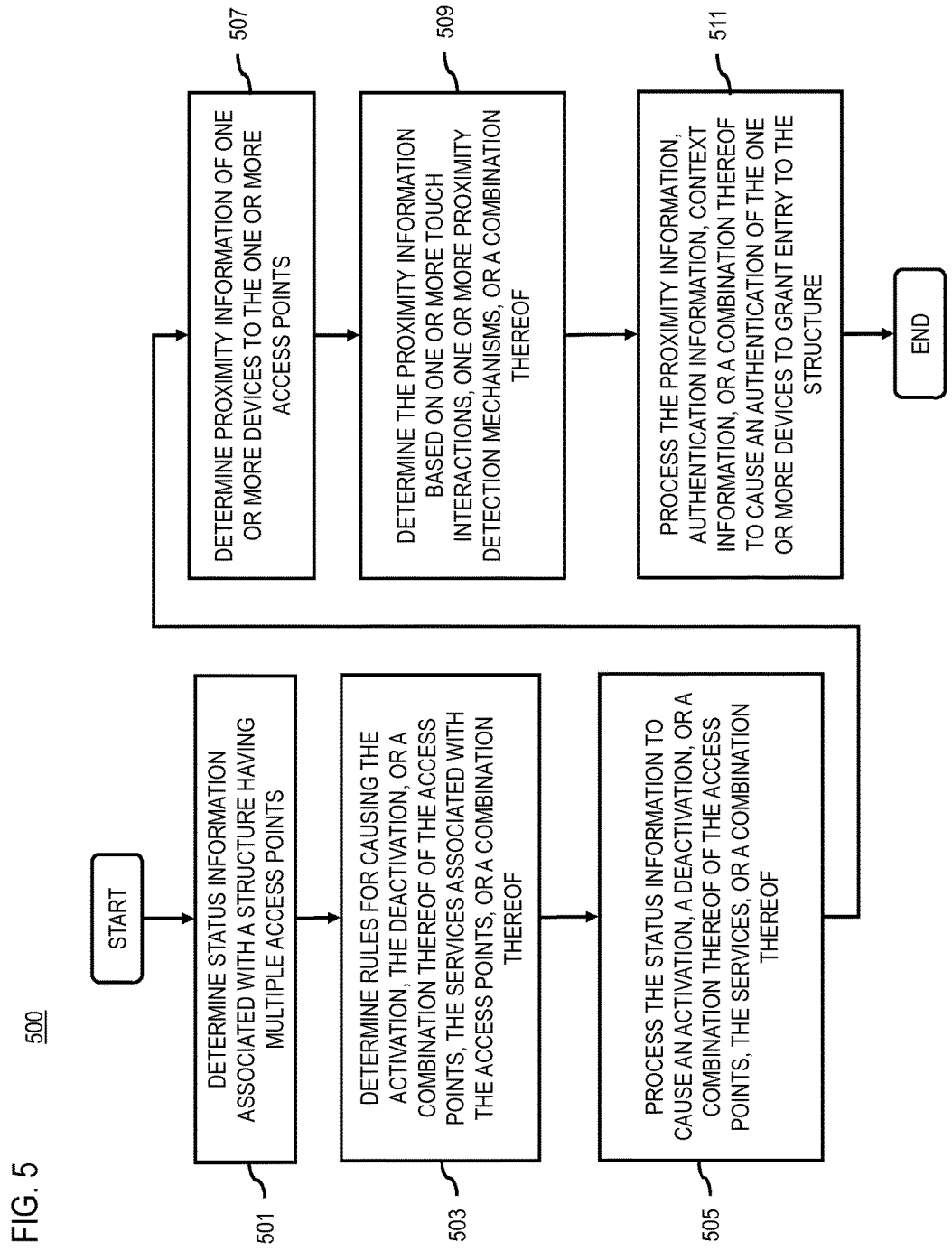
FIG. 5 is a flowchart of a process for configuring one or more mobile devices to multiple access points and/or services associated with at least one structure, according to one embodiment.
Figure 8:
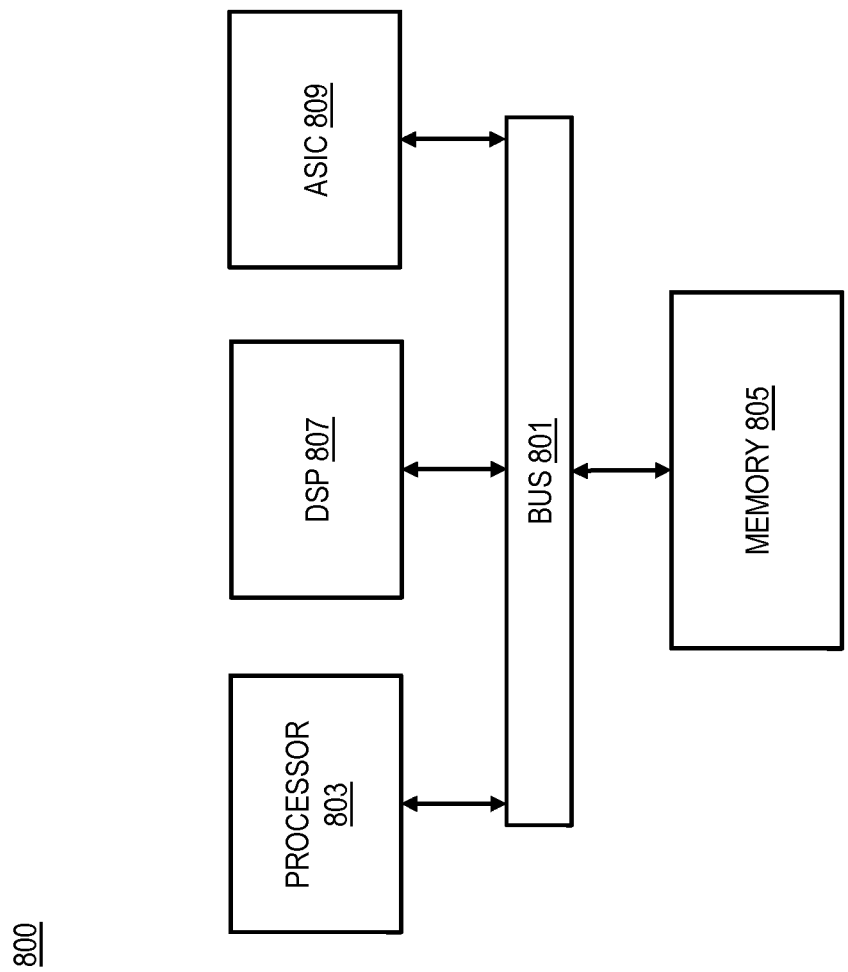
FIG. 8 is a diagram of a chip set that can be used to implement an embodiment of the invention.

FIG. 5 is a flowchart of a process for configuring one or more mobile devices to multiple access points and/or services associated with at least one structure, according to one embodiment. In one embodiment, the access platform 103 performs the process 500 and is implemented in, for instance, a chip set including a processor and a memory as shown in FIG. 8. In step 501, the access platform 103 determines status information associated with at least one structure, wherein the at least one structure is associated with one or more access points located in one part of the at least one structure, one or more other access points located in another part of the at least one structure, or a combination thereof. More specifically, the at least one structure includes, at least in part, one or more vehicles (e.g., a car) or one or more buildings (e.g., a home). In addition, the status information is based, at least in part, on a locked state, an operational state, or a combination thereof of the at least one structure, the one or more access points located in one part of the structure (e.g., the exterior), the one or more other access points located in another part of the structure (e.g., the interior), or a combination thereof. Further, the one or more access points, the one or more other access points, or a combination thereof provide for short-range wireless communications including, at least in part, Bluetooth, NFC, or a combination thereof. Moreover, the one or more services associated with the one or more access points located in one part of the at least one structure are associated with controlling entry to the at least one structure.

By way of example, in one example use case, the structure is a vehicle that has at least two Bluetooth access points, wherein minimally one or more access points are located in one part of the vehicle (e.g., the exterior) and one or more access points are located in another part of the vehicle (e.g., the interior). As a result, different services can be made available at different parts of the vehicle. For example, the one or more access points located in one part of the vehicle (e.g., the exterior) can be associated with controlling entry to the vehicle and the one or more access points located in another part of the vehicle (e.g., the interior) can be associated with one or more interior-related services (e.g., loudspeakers, steering wheel buttons, hands-free or text-to-speech systems, displays, projectors, etc.). In another example use case, the structure is a building (e.g., a home) and the one or more access points located in one part of the building (e.g., the exterior) can similarly be associated with controlling entry (e.g., keyless entry) and the one or more access points located in another part of the building (e.g., the interior) can be associated with one or more interior-related services (e.g., environmental and/or media controls).

In step 503, the access platform 103 determines one or more rules for causing, at least in part, the activation, the deactivation, or a combination thereof of the one or more access points, the one or more services associated with the one or more access points, the one or more other access points, the one or more other services associated with the one or more other access points, or a combination thereof. More specifically, the one or more rules specify one or more dependencies among the one or more access points, the one or more other access points, the one or more other services associated with the one or more other access points, or a combination thereof (e.g., a sequence of activations and/or deactivations). By way of example, when the structure (e.g., a vehicle) is locked, the one or more access points located in one part of the structure (e.g., the exterior) may be set to do inquiry with limited Tx power to prevent "RF pollution" or the one or more access points located in one part of the structure can be programmed to do inquiry at certain intervals (e.g., typically at 2.56 s intervals). At the same time, the one or more access points located in another part of the structure (e.g., the interior) are deactivated by the access platform 103. Therefore, in the locked state, unlocking the vehicle is the only available service. However, once the vehicle is unlocked (e.g., by touching), the access platform 103 can determine to switch the inquiry status of the one or more access points so that the one or more access points located in one part of the structure are deactivated and the one or more access points located in another part of the structure begin to do inquiry.

In step 505, the access platform processes and/or facilitates a processing of the status information to cause, at least in part, an activation, a deactivation, or a combination thereof of the one or more access points, one or more services associated with the one or more access points, the one or more other access points, one or more other services associated with the one or more other access points, or a combination thereof. As previously discussed, the status information is based, at least in part, on a locked state, an operational state, or a combination thereof of the at least one structure (e.g., a vehicle), the one or more access points located in one part of the structure (e.g., the exterior), the one or more other access points located in another part of the structure (e.g., the interior), or a combination thereof. Moreover, the activation, the deactivation, or a combination thereof is based, at least in part, on the one or more rules and/or dependencies. By way of example, when the vehicle is locked, the one or more access points located in one part of the vehicle (e.g., the exterior) are activated and in inquiry mode, whereas the one or more access points located in another part of the vehicle (e.g., the interior) are deactivated. However, once a door to the vehicle is unlocked (e.g., by a touching interaction), the one or more access points located in one part of the vehicle are deactivated and the one or more access points located in another part of the vehicle are activated and begin to do inquiry.

In step 507, the access platform 103 determines proximity information of one or more devices to the one or more access points, the one or more other access points, or a combination thereof based, at least in part, on one or more inquiry messages, one or more connectivity requests, or a combination thereof exchanged among the one or more devices, the one or more access points, the one or more other access points, or a combination thereof. By way of example, in an example use case using Bluetooth, the discovering device (e.g., an exterior access point) is in inquiry mode and sends one or more ID packets and the discoverable device (e.g., a mobile device) scans periodically for ID packets and responds with FHS packets. In addition, the discoverable device may send an EIR after the FHS to deliver more information about the device. It is contemplated that if the one or more devices, the one or more access points, the one or more other access points, or a combination thereof are able to exchange ID, EIR, and FHS packets, respectively, then the one or more devices, the one or more access points, the one or more other access points, or a combination thereof must be relatively close to one another.

In step 509, the access platform determines the proximity information based, at least in part, on one or more touch interactions, one or more proximity detection mechanisms, or a combination thereof. By way of example, touch interaction can refer to a method of expediting wireless configuration (e.g., device discovery and selection) based, at least in part, on RSSI values. More specifically, when the discovering device (e.g., an external access point) receives the inquiry response from the discoverable device (e.g., a mobile phone), it defines an RSSI value from the FHS. As previously discussed, the RSSI reading of a device can be followed and once it reaches a threshold criteria (e.g., in touching range) the discovering device (e.g., an external access point) can be selected. More specifically, in this example use case, the user associated with the mobile device is selecting part of the vehicle (e.g., an exterior access point) by touching it (i.e., Touch-to-be-Selected).

In step 511, the access platform 103 processes and/or facilitates the processing of the proximity information, authentication information, context information, or a combination thereof to cause, at least in part, an authentication of the one or more devices to grant entry to the at least one structure, wherein the authentication further authenticates the one or more devices with respect to the one or more other access points, the one or more other services associated with the one or more other access points, or a combination thereof. By way of example, in one example use case, when a vehicle is locked, the one or more access points located in one part of the vehicle (e.g., the exterior) are activated by the access platform 103 and are doing inquiry (e.g., at 2.56 s intervals). When a device (e.g., a mobile phone) is found by the one or more access points located in one part of the vehicle, the access platform 103 checks the RSSI level of the device to determine if it is in the predetermined range of action (i.e., whether the RSSI level is above a certain threshold). If the access platform 103 determines that the RSSI level is above the threshold, then the access platform 103 determines if the Bluetooth address of the device is in the authenticated devices list (e.g., the device of the vehicle's owner). If so, then the access platform 103 attempts to make a secure connection between the device and the access point. As previously discussed, this process ensures that this device is really authenticated because only authenticated devices have the correct link keys. If it is not authenticated (e.g., it is somehow faking the Bluetooth address) the access platform 103 returns the one or more access points located in one part of the vehicle (e.g., the exterior) to an inquiry status. However, if it is authenticated then the access platform 103 unlocks the doors of the vehicle, deactivates the one or more access points located in one part of the vehicle, and activates the one or more access points located in another part of the vehicle. In addition, the access platform 103 can initiate one or more internal services based on the particular user that has entered the vehicle and from which door he or she has entered (e.g., adjust mirrors, seats, etc. according to personal preferences). If on the other hand, the device is not authenticated (e.g., a device of a random passerby), then the access platform 103 returns the one or more access points located in one part of the vehicle (e.g., the exterior) to an inquiry status.

Figure 6:
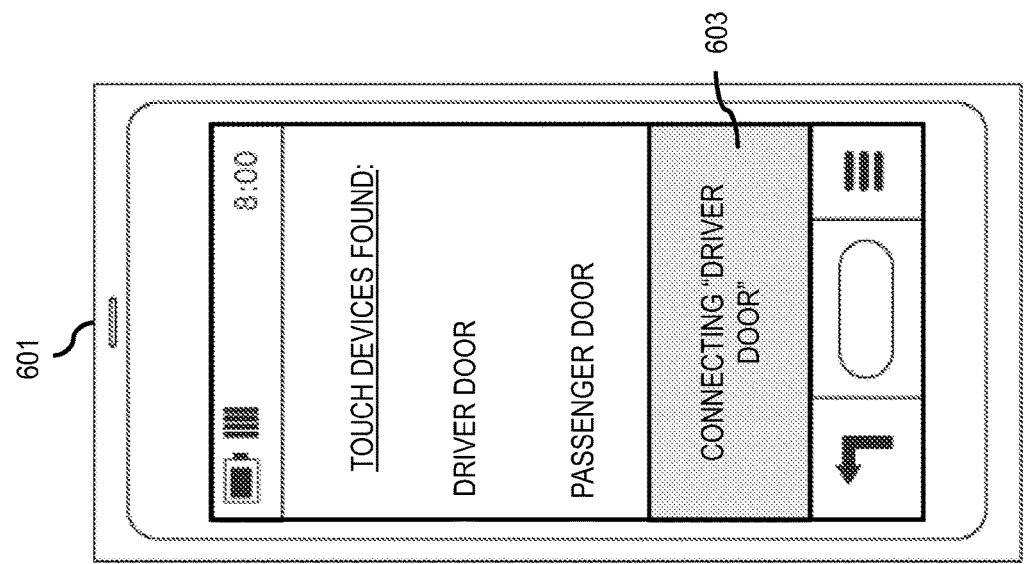
FIG. 6 is a diagram of a user interface utilized in the processes of FIG. 5, according to various embodiments.

FIG. 6 is a diagram of a user interface utilized in the processes of FIG. 5, according to various embodiments. As shown, the example user interface of FIG. 6 includes one or more user interface elements and/or functionalities created and/or modified based, at least in part, on information, data, and/or signals resulting from the process (e.g., process 500) described with respect to FIG. 5. More specifically, FIG. 6 illustrates a user interface (e.g., interface 601) of a mobile device using Bluetooth to select part of a vehicle system (e.g., an entry mechanism) by one or more touching interactions. In particular, two discovering devices associated with a vehicle (e.g., "Driver Door" and "Passenger Door") are doing inquiry and have found interface 601. The system 100 checks the RSSI level of the interface 601 relative to the two access points and determines that interface 601 is in the predetermined range of action (e.g., the RSSI level is above a certain threshold). As previously discussed, the system 100 next determines whether the Bluetooth address of the interface 601 is in the authenticated devices list. If so, the system 100 attempts to make a secure connection between the interface 601 and the access point (e.g., "Driver Door") as depicted by notification 603. If the interface 601 is authenticated, then the system 100 will unlock the door corresponding to the touched access point (e.g., "Driver Door") and deactivate the one or more exterior access points.

The processes described herein for configuring one or more mobile devices to multiple access points and/or services associated with at least one structure may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
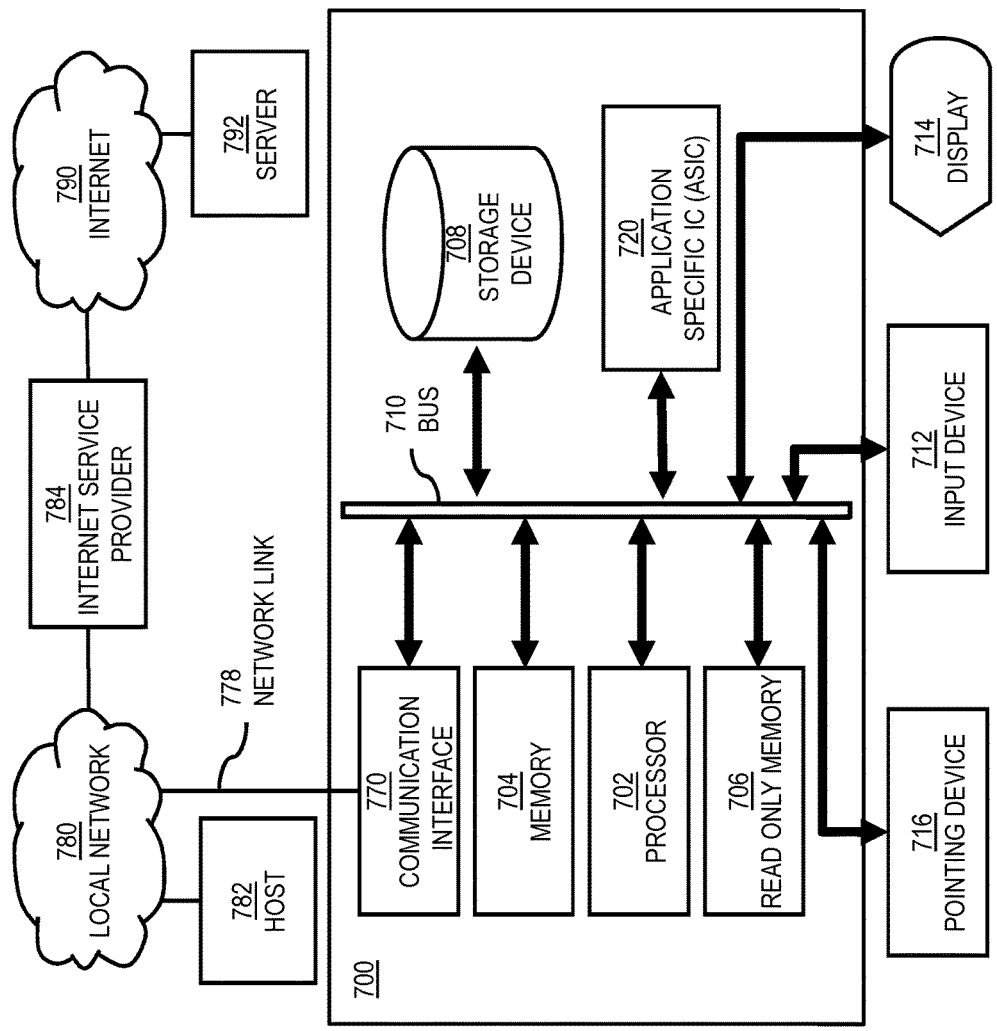
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to configure one or more mobile devices to multiple access points and/or services associated with at least one structure as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of configuring one or more mobile devices to multiple access points and/or services associated with at least one structure.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to configure one or more mobile devices to multiple access points and/or services associated with at least one structure. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for configuring one or more mobile devices to multiple access points and/or services associated with at least one structure. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for configuring one or more mobile devices to multiple access points and/or services associated with at least one structure, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for configuring one or more mobile devices to multiple access points and/or services associated with at least one structure to the UEs 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to configure one or more mobile devices to multiple access points and/or services associated with at least one structure as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of configuring one or more mobile devices to multiple access points and/or services associated with at least one structure.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to configure one or more mobile devices to multiple access points and/or services associated with at least one structure. The memory 805 also stores the data associated with or generated by the execution of the inventive steps.

Figure 9:
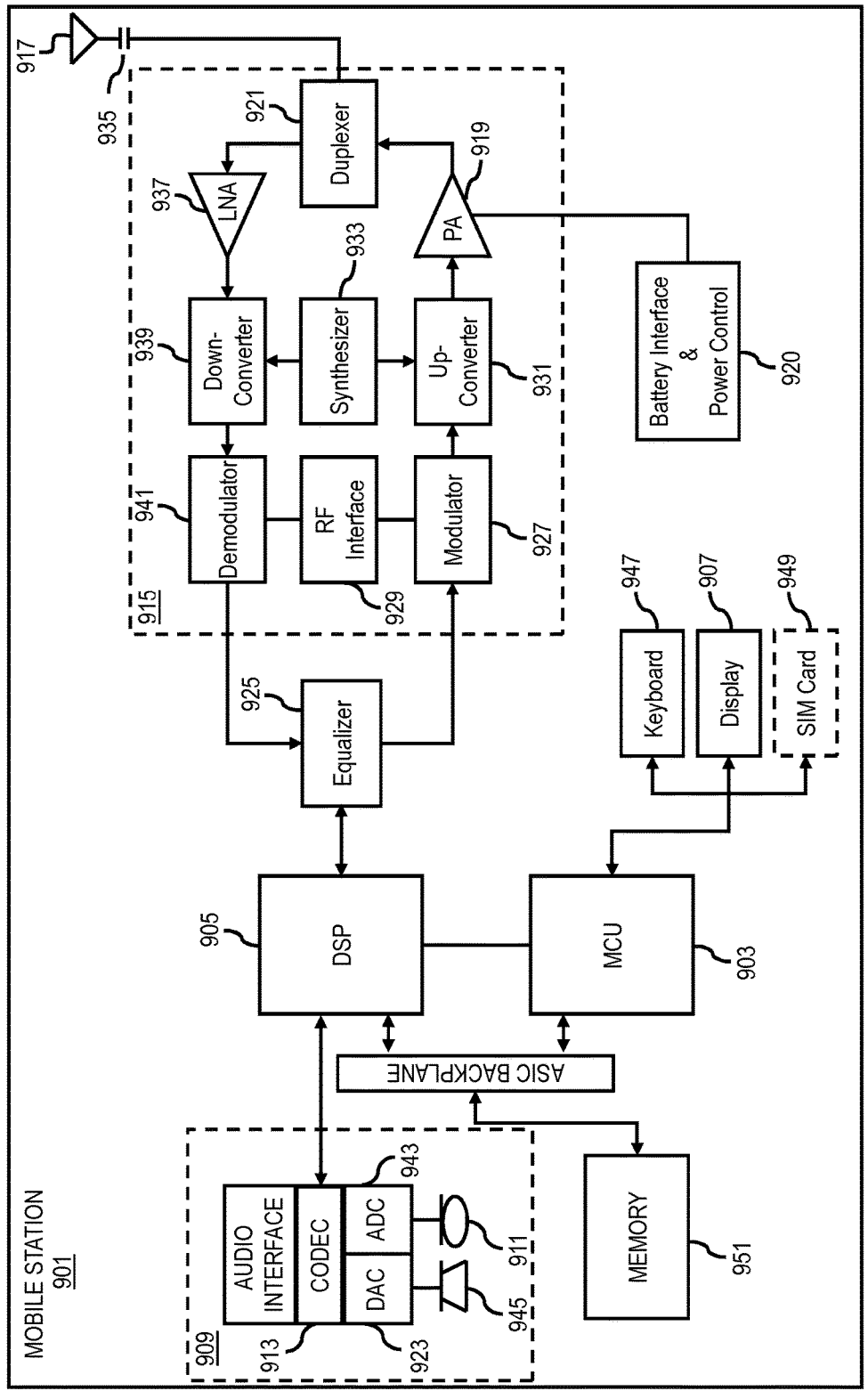
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of configuring one or more mobile devices to multiple access points and/or services associated with at least one structure. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of configuring one or more mobile devices to multiple access points and/or services associated with at least one structure. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to configure one or more mobile devices to multiple access points and/or services associated with at least one structure. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method performed by an apparatus comprising facilitating a processing of and/or processing (1) data and/or (2) information and/or (3) at least one signal, the (1) data and/or (2) information and/or (3) at least one signal based, at least in part, on the following:
    at least one determination of status information associated with at least one structure, performed by the apparatus, wherein the at least one structure is associated with one or more access points located in one part of the at least one structure and one or more other access points located in another part of the at least one structure;
    a processing of the status information, performed by the apparatus, to cause, at least in part, an activation, a deactivation, or a combination thereof of the one or more access points, one or more services associated with the one or more access points, the one or more other access points, one or more other services associated with the one or more other access points, or a combination thereof,
    wherein the one or more services associated with the one or more access points and the one or more other services associated with the one or more other access points are associated with controlling the at least one structure; and
    at least one determination of one or more rules for causing, at least in part, the activation, the deactivation, or a combination thereof of the one or more access points, the one or more services associated with the one or more access points, the one or more other access points, the one or more other services associated with the one or more other access points, or a combination thereof.

2. A method of claim 1, wherein the (1) data and/or (2) information and/or (3) at least one signal are further based, at least in part, on the following:
    at least one determination of proximity information of one or more devices to the one or more access points, the one or more other access points, or a combination thereof based, at least in part, on one or more inquiry messages, one or more connectivity requests, or a combination thereof exchanged among the one or more devices, the one or more access points, the one or more other access points, or a combination thereof.

3. A method of claim 1, wherein the (1) data and/or (2) information and/or (3) at least one signal are further based, at least in part, on the following:
    at least one determination of the proximity information based, at least in part, on one or more touch interactions, one or more proximity detection mechanisms, or a combination thereof.

4. A method of claim 1, wherein the one or more services associated with the one or more access points located in one part of the at least one structure are associated with controlling entry to the at least one structure.

5. A method of claim 4, wherein the (1) data and/or (2) information and/or (3) at least one signal are further based, at least in part, on the following:
    a processing of the proximity information, authentication information, context information, or a combination thereof to cause, at least in part, an authentication of the one or more devices to grant entry to the at least one structure, wherein the authentication further authenticates the one or more devices with respect to the one or more other access points, the one or more other services associated with the one or more other access points, or a combination thereof.

6. A method of claim 1, wherein the one or more rules specify one or more dependencies among the one or more access points, the one or more services associated with the one or more access points, the one or more other access points, the one or more other services associated with the one or more other access points, or a combination thereof.

7. A method of claim 1, wherein the status information is based, at least in part, on a locked state, an operational state, or a combination thereof of the at least one structure, the one or more access points, the one or more other access points, or a combination thereof.

8. A method of claim 1, wherein the one or more access points, the one or more other access points, or a combination thereof provide for short range wireless communications including, at least in part, Bluetooth, near field communications, or a combination thereof.

9. A method of claim 1, wherein the at least one structure includes, at least in part, one or more vehicles or one or more buildings.

10. An apparatus comprising:
    at least one processor; and
    at least one memory including computer program code for one or more programs,
    the at least one memory and the computer program code configured to, with the at least one processor, cause the apparatus to perform at least the following,
    determine status information associated with at least one structure, wherein the at least one structure is associated with one or more access points located in one part of the at least one structure and one or more other access points located in another part of the at least one structure;
    process and/or facilitate a processing of the status information to cause, at least in part, an activation, a deactivation, or a combination thereof of the one or more access points, one or more services associated with the one or more access points, the one or more other access points, one or more other services associated with the one or more other access points, or a combination thereof,
    wherein the one or more services associated with the one or more access points and the one or more other services associated with the one or more other access points are associated with controlling the at least one structure and change based; and determine one or more rules for causing, at least in part, the activation, the deactivation, or a combination thereof of the one or more access points, the one or more services associated with the one or more access points, the one or more other access points, the one or more other services associated with the one or more other access points, or a combination thereof.

11. An apparatus of claim 10, wherein the apparatus is further caused to:

determine proximity information of one or more devices to the one or more access points, the one or more other access points, or a combination thereof based, at least in part, on one or more inquiry messages, one or more connectivity requests, or a combination thereof exchanged among the one or more devices, the one or more access points, the one or more other access points, or a combination thereof.

12. An apparatus of claim 11, wherein the apparatus is further caused to:

determine the proximity information based, at least in part, on one or more touch interactions, one or more proximity detection mechanisms, or a combination thereof.

13. An apparatus of claim 10, wherein the one or more services associated with the one or more access points located in one part of the at least one structure are associated with controlling entry to the at least one structure.

14. An apparatus of claim 13, wherein the apparatus is further caused to:

process and/or facilitate a processing of the proximity information, authentication information, context information, or a combination thereof to cause, at least in part, an authentication of the one or more devices to grant entry to the at least one structure, wherein the authentication further authenticates the one or more devices with respect to the one or more other access points, the one or more other services associated with the one or more other access points, or a combination thereof.

15. An apparatus of claim 10, wherein the one or more rules specify one or more dependencies among the one or more access points, the one or more services associated with the one or more access points, the one or more other access points, the one or more other services associated with the one or more other access points, or a combination thereof.

16. An apparatus of claim 10, wherein the status information is based, at least in part, on a locked state, an operational state, or a combination thereof of the at least one structure, the one or more access points, the one or more other access points, or a combination thereof.

17. An apparatus of claim 10, wherein the one or more access points, the one or more other access points, or a combination thereof provide for short range wireless communications including, at least in part, Bluetooth, near field communications, or a combination thereof.

18. An apparatus of claim 10, wherein the at least one structure includes, at least in part, one or more vehicles or one or more buildings.

* * * * *